(12) United States Patent
Han et al.

(10) Patent No.: US 9,454,045 B2
(45) Date of Patent: Sep. 27, 2016

(54) LIQUID CRYSTAL DISPLAY

(71) Applicant: Samsung Display Co., Ltd., Yongin (KR)

(72) Inventors: Min Ju Han, Seoul (KR); Su Jeong Kim, Seoul (KR); Dan Bi Yang, Gunpo-si (KR); Ji Phyo Hong, Pyeongtaek-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 55 days.

(21) Appl. No.: 14/522,354

(22) Filed: Oct. 23, 2014

(65) Prior Publication Data

US 2015/0116645 A1    Apr. 30, 2015

(30) Foreign Application Priority Data

Oct. 25, 2013 (KR) ........................ 10-2013-0128081

(51) Int. Cl.
*G02F 1/1343* (2006.01)
*G02F 1/1362* (2006.01)
*G02F 1/1368* (2006.01)
*G02F 1/1337* (2006.01)

(52) U.S. Cl.
CPC ... *G02F 1/134309* (2013.01); *G02F 1/133707* (2013.01); *G02F 1/136227* (2013.01); *G02F 2001/133742* (2013.01); *G02F 2001/134345* (2013.01); *G02F 2201/123* (2013.01)

(58) Field of Classification Search
None
See application file for complete search history.

(56) References Cited

U.S. PATENT DOCUMENTS

| 6,515,727 B2 | 2/2003 | Yoon et al. |
| 7,499,133 B2 | 3/2009 | Hsu et al. |
| 7,834,969 B2 | 11/2010 | Yang et al. |

(Continued)

FOREIGN PATENT DOCUMENTS

| KR | 10-2001-0009651 | 2/2001 |
| KR | 10-2008-0084196 | 9/2008 |

(Continued)

OTHER PUBLICATIONS

Tien-Lun Ting et al., "A novel coupled charge-shared structure on polymer sustained alignment mode," IDW 2012, pp. 941-944.

(Continued)

*Primary Examiner* — Ashok Patel
(74) *Attorney, Agent, or Firm* — H.C. Park & Associates, PLC

(57) ABSTRACT

According to an exemplary embodiment of the present invention, a liquid crystal display includes: a first substrate; a first subpixel electrode disposed on the first substrate, supplied with a first voltage and including a first sub region and a second sub region; a second subpixel electrode disposed on the first substrate and supplied with a second voltage; an insulating layer disposed on the first sub region of the first subpixel electrode and disposed beneath the second subpixel electrode and the second sub region of the first subpixel electrode; a second substrate facing the first substrate; and a common electrode disposed on the second substrate, in which a first region in which the first subpixel electrode is formed includes four distinct areas having different characteristics.

10 Claims, 11 Drawing Sheets

(56) References Cited

U.S. PATENT DOCUMENTS

| | | | | |
|---|---|---|---|---|
| 2009/0009677 | A1* | 1/2009 | Yamazaki | G02F 1/1368 349/43 |
| 2009/0310075 | A1* | 12/2009 | Kim | G02F 1/133707 349/144 |
| 2011/0051057 | A1* | 3/2011 | Song | G02F 1/1393 349/106 |
| 2012/0249940 | A1* | 10/2012 | Choi | G02F 1/133753 349/123 |
| 2013/0002625 | A1* | 1/2013 | Liao | G02F 1/134309 345/205 |
| 2013/0135563 | A1* | 5/2013 | Kubota | G02F 1/134363 349/96 |

FOREIGN PATENT DOCUMENTS

| | | |
|---|---|---|
| KR | 10-2011-0111212 | 10/2011 |
| KR | 10-2014-0097905 | 8/2014 |

OTHER PUBLICATIONS

Kun-Cheng Tien et al, "Premium picture quality by super-multi-domain polymer sustained alignment LCD technology" SID 2012 Digest, pp. 371-374.

* cited by examiner (a)  (b)  (c)  (d)

LIQUID CRYSTAL DISPLAY

CROSS REFERENCE TO RELATED APPLICATION

This application claims priority from and the benefit of Korean Patent Application No. 10-2013-0128081, filed on Oct. 25, 2013, which is hereby incorporated by reference for all purposes as if fully set forth herein.

BACKGROUND

1. Field

Exemplary embodiments of the present invention relate to a liquid crystal display.

2. Background

A liquid crystal display is a type of flat panel display that is currently widely used. A liquid crystal display typically includes two display panels including field generating electrodes, such as a pixel electrode and a common electrode, and a liquid crystal layer disposed therebetween.

The field generating electrode is supplied with a voltage to generate an electric field in the liquid crystal layer. The orientation of liquid crystal molecules of the liquid crystal layer is determined and polarization of incident light is controlled based on the generated electric field, thereby displaying an image.

Typically, the liquid crystal display further includes switching elements connected to each of the pixel electrodes and a plurality of signal lines. The signal lines may include such as gate lines and data lines, which control the switching elements to apply a voltage to the pixel electrodes.

A liquid crystal display having a vertically aligned mode in which the major axes of the liquid crystal molecules are aligned to be vertical to the display panel in the state in which an electric field is not applied has a large contrast ratio and a wide reference viewing angle, and therefore has received attention. "Reference viewing angle" means a viewing angle in which a contrast ratio is 1:10 or an inter-gray luminance inversion critical angle.

In a vertically aligned liquid crystal display, a method of dividing one pixel into two subpixels by applying a different voltage to each of the two subpixels so that each of the two subpixels has a different transmittance has been proposed. This configuration may improve side visibility of the display. However, in this configuration, luminance may be increased at a low gray or a high gray, such that it is difficult to represent a gray at the side, thereby causing the reduction in image quality.

Further, when the one pixel is divided into the two subpixels, the transmittance may be reduced by an interval between the two subpixels. Further still, the transmittance may be reduced due to an irregular behavior of liquid crystal molecules at an outer edge of the pixel electrode.

Therefore, a method of dividing one pixel area into three areas, including an area in which a first subpixel electrode is formed, an area in which the first subpixel electrode and a second subpixel electrode overlap each other, and an area in which the second subpixel electrode is formed has been proposed.

However, even when the one pixel area is divided into the three areas, the luminance may be increased at the low gray or the high gray, such that it is still difficult to represent the gray at the side.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a liquid crystal display capable of accurately representing a gray in a low gray region while improving side visibility so that it may resemble front visibility.

Additional features of the invention will be set forth in the description which follows, and in part will be apparent from the description, or may be learned by practice of the invention.

An exemplary embodiment of the present invention discloses a liquid crystal display, including: a first substrate; a first subpixel electrode disposed on the first substrate, supplied with a first voltage and including a first sub region and a second sub region; a second subpixel electrode disposed on the first substrate and supplied with a second voltage; an insulating layer disposed in the first sub region of the first subpixel electrode and disposed beneath the second subpixel electrode and the second sub region of the first subpixel electrode; a second substrate facing the first substrate; and a common electrode disposed on the second substrate. In the liquid crystal display, a first region in which the first subpixel electrode is formed may include a first area in which a first portion of the second sub region of the first subpixel electrode is disposed, a second area in which a second portion of the second sub region of the first subpixel electrode is disposed, a third area in which a first portion of the first sub region of the first subpixel electrode and a third portion of the second sub region overlap each other, having the insulating layer disposed therebetween, and a fourth area in which a second portion of the first sub region of the first subpixel electrode is disposed.

According to the liquid crystal display according to the exemplary embodiments of the present invention, it is possible to accurately represent the gray in the low gray region while improving the side visibility to be like the front visibility.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
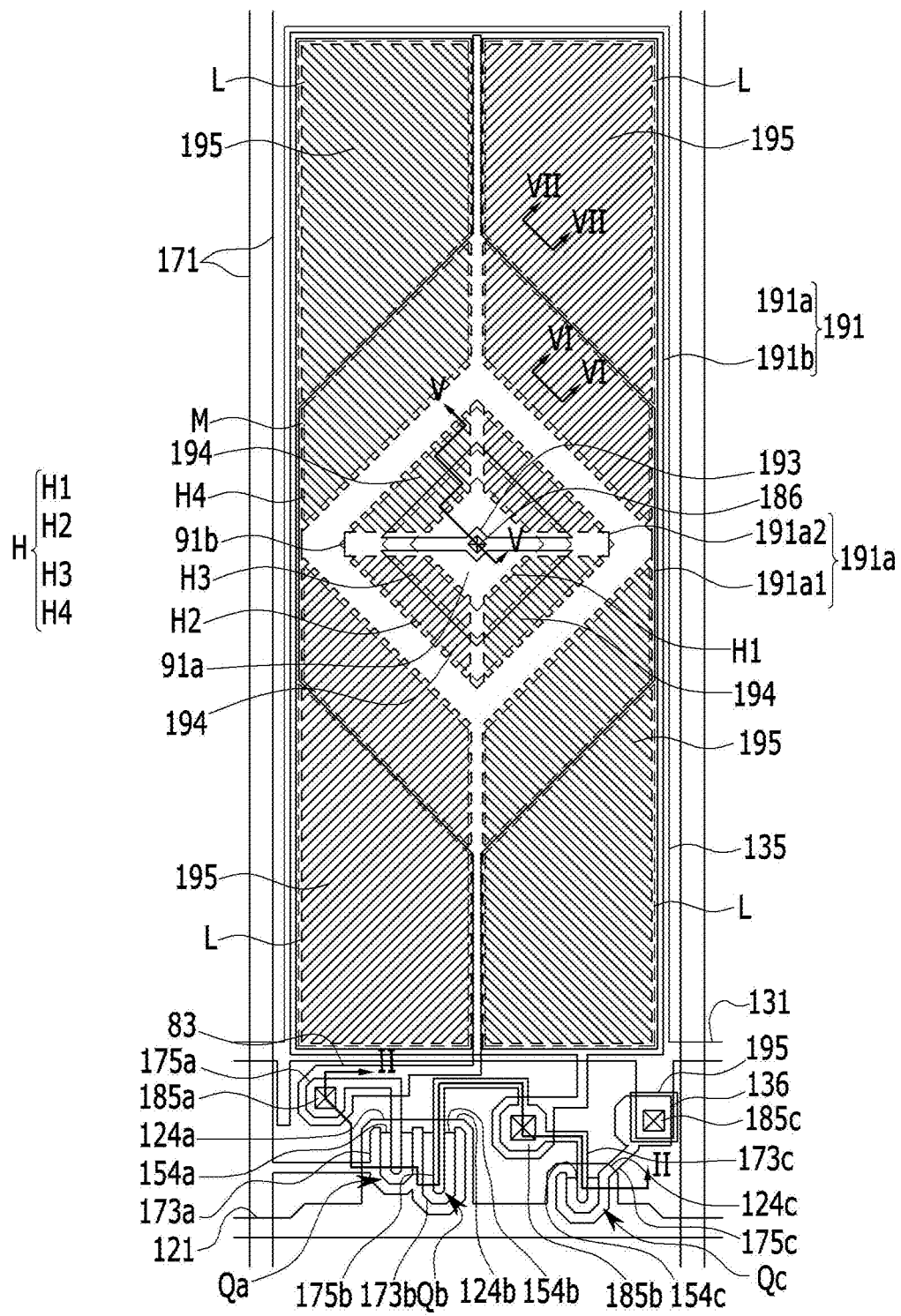
FIG. 1 is a layout view of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, a liquid crystal display according to an exemplary embodiment of the present invention will be described with reference to the accompanying drawings.

Figure 2:
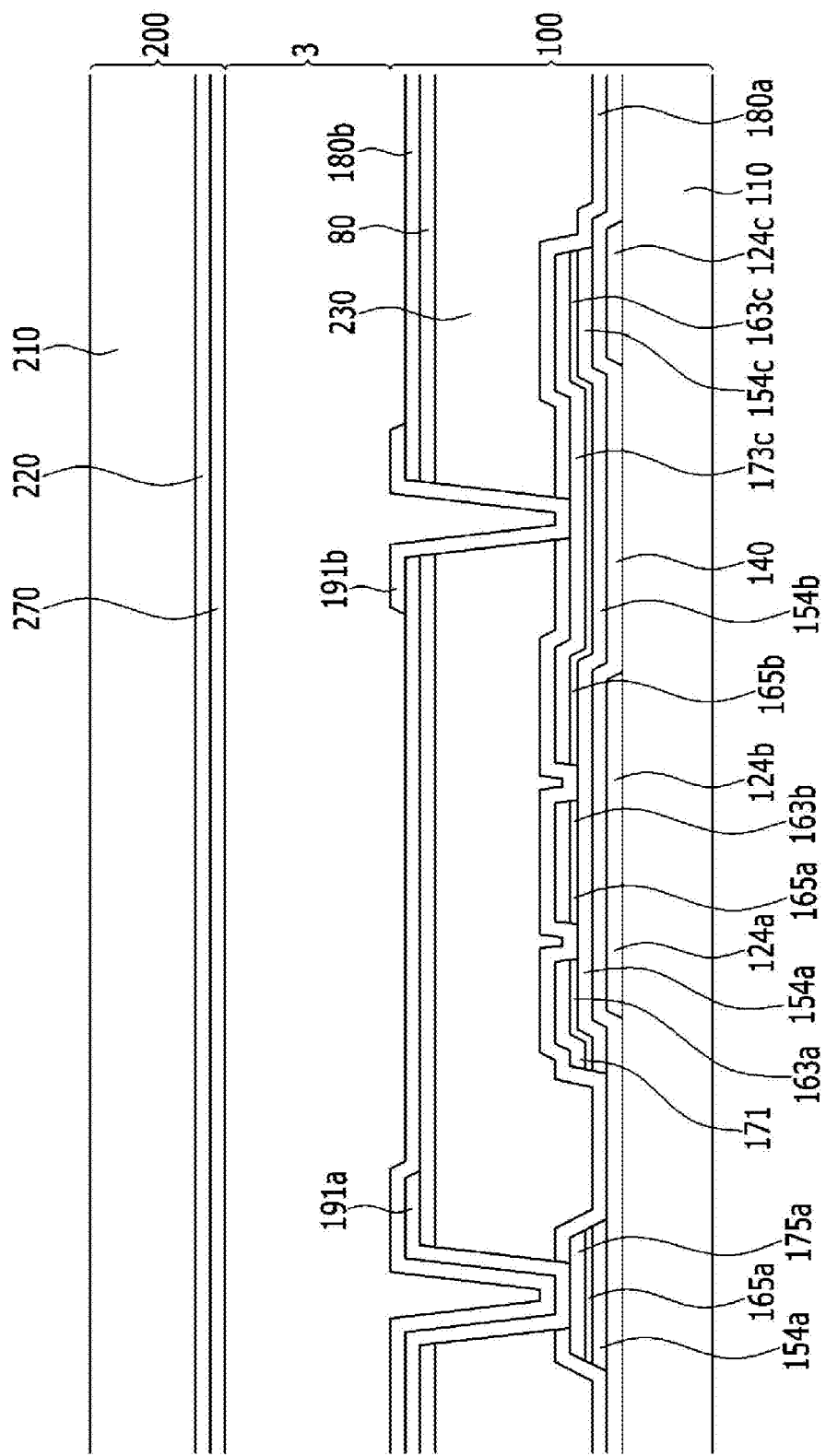
FIG. 2 is a cross-sectional view of the liquid crystal display of FIG. 1 taken along the line II-II.
Figure 3:
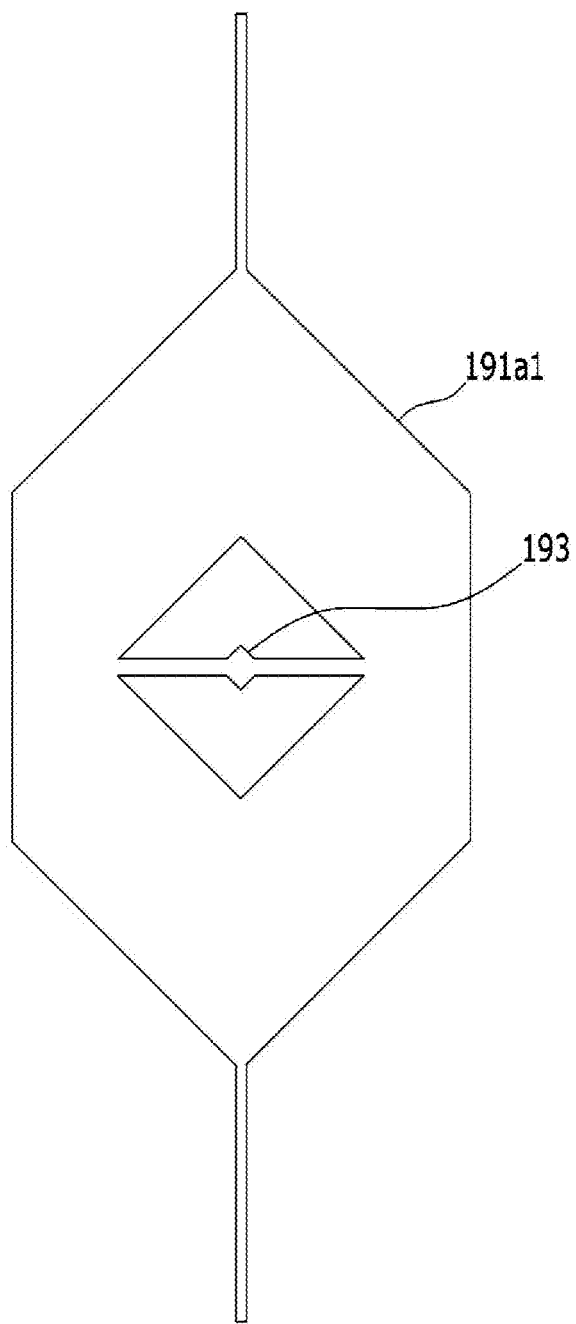
FIG. 3 is a layout view of a first portion of a first subpixel electrode of the liquid crystal display of FIG. 1.
Figure 4:
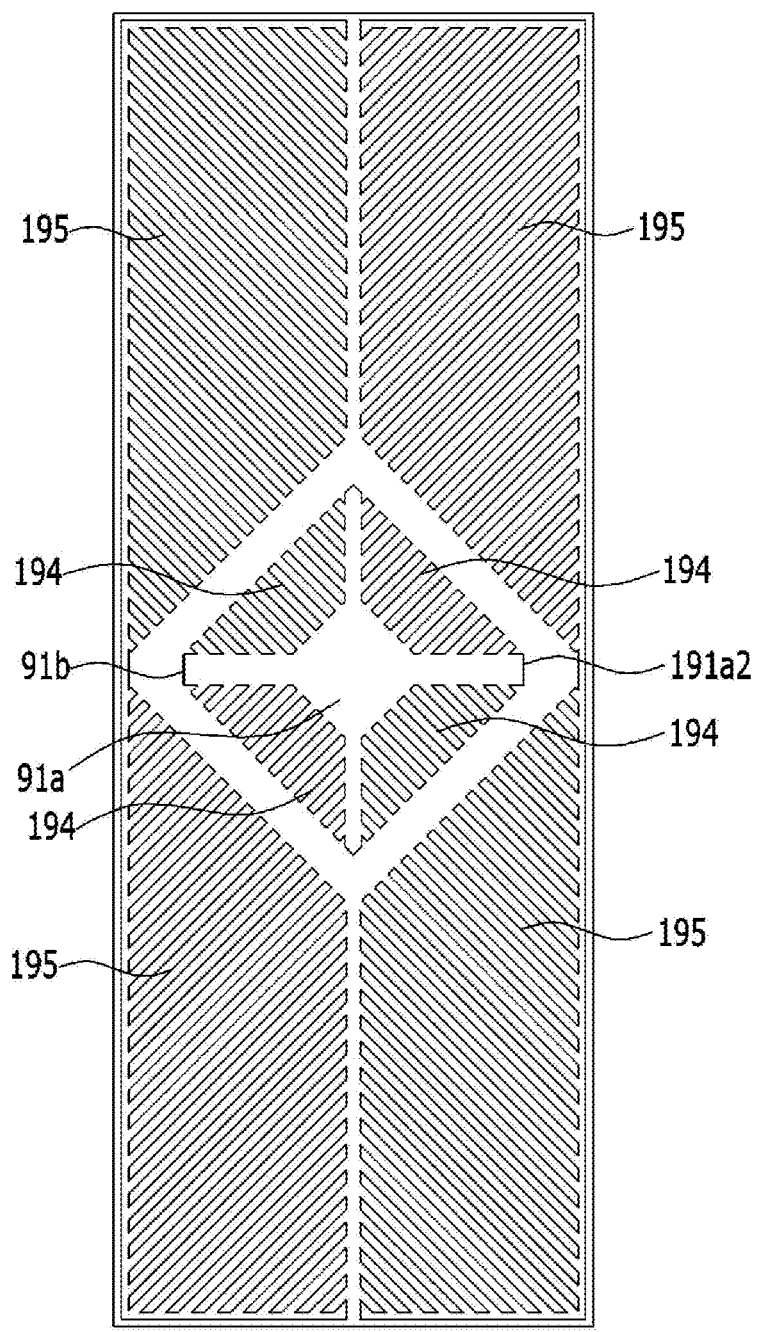
FIG. 4 is a layout view of a second portion of the first subpixel electrode and a second subpixel electrode of the liquid crystal display of FIG. 1.
Figure 5:
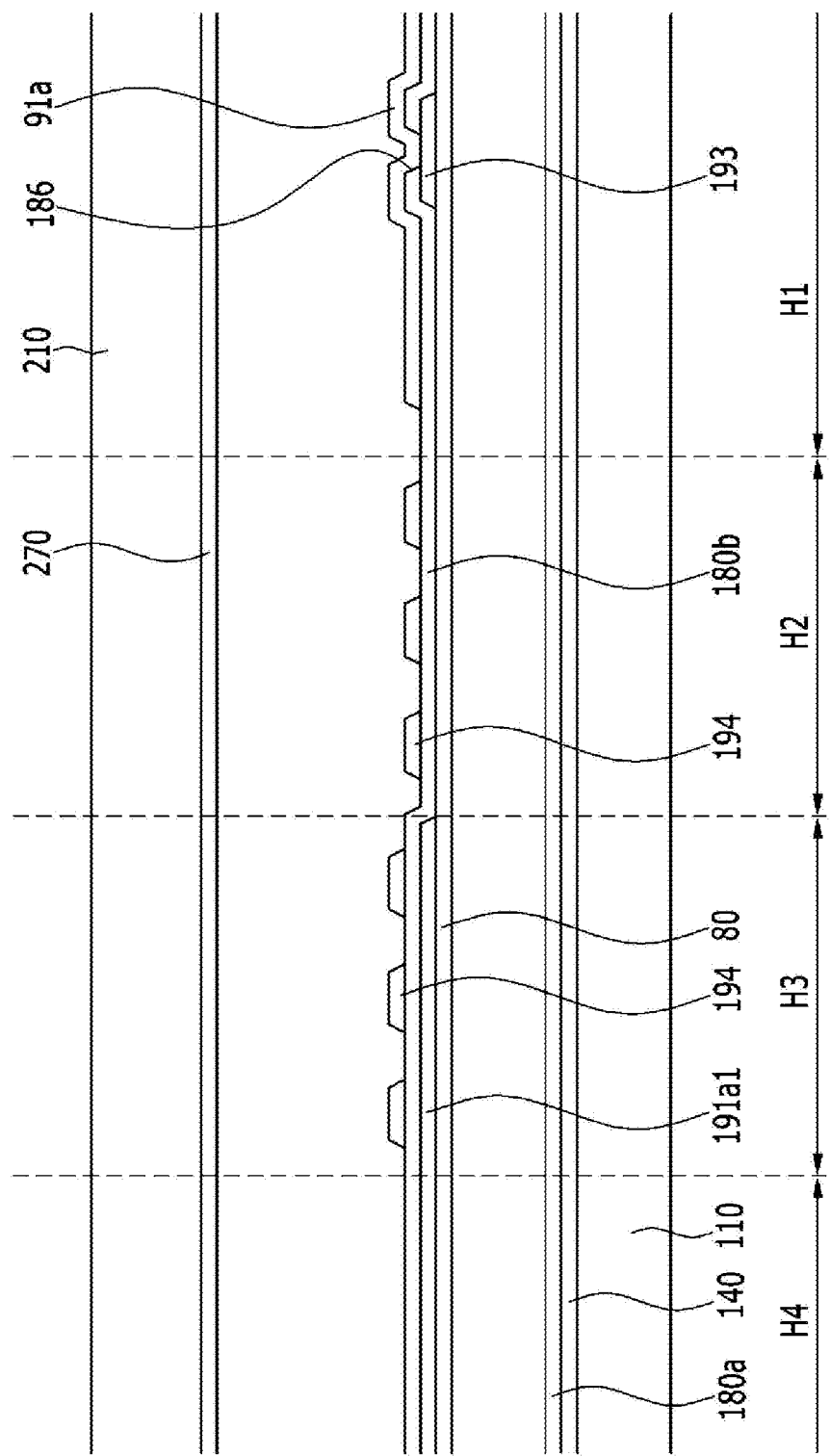
FIG. 5 is a cross-sectional view of the liquid crystal display of FIG. 1 taken along the line V-V.
Figure 6:
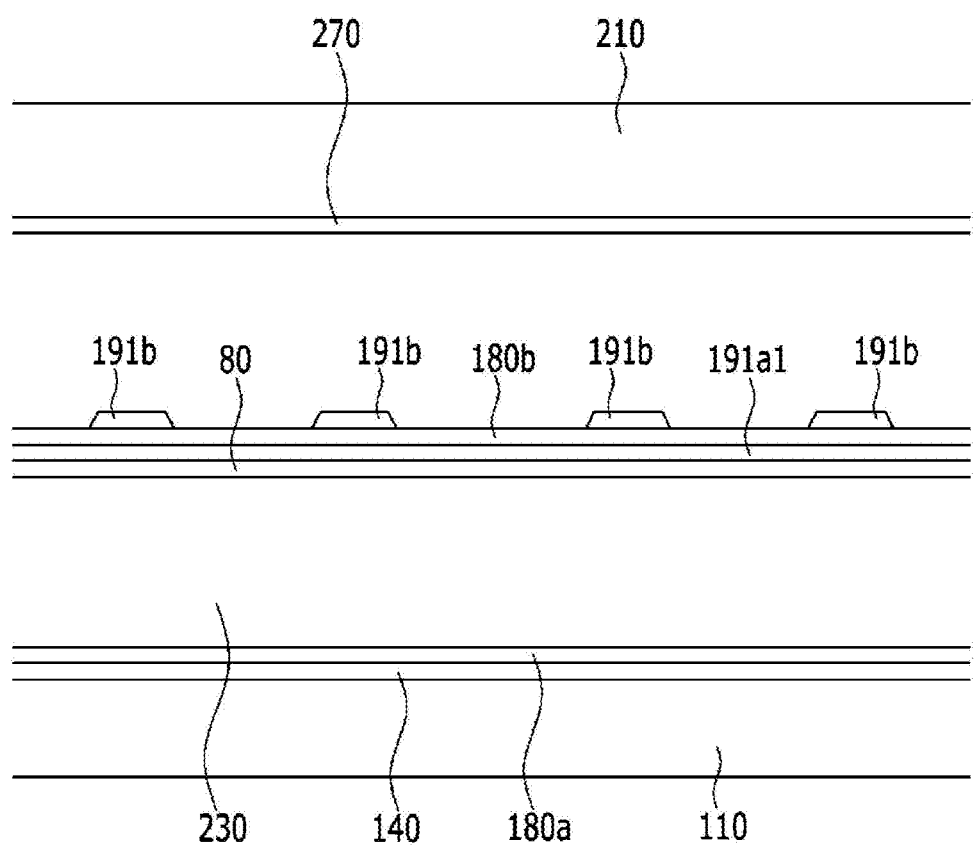
FIG. 6 is a cross-sectional view of the liquid crystal display of FIG. 1 taken along the line VI-VI.
Figure 7:
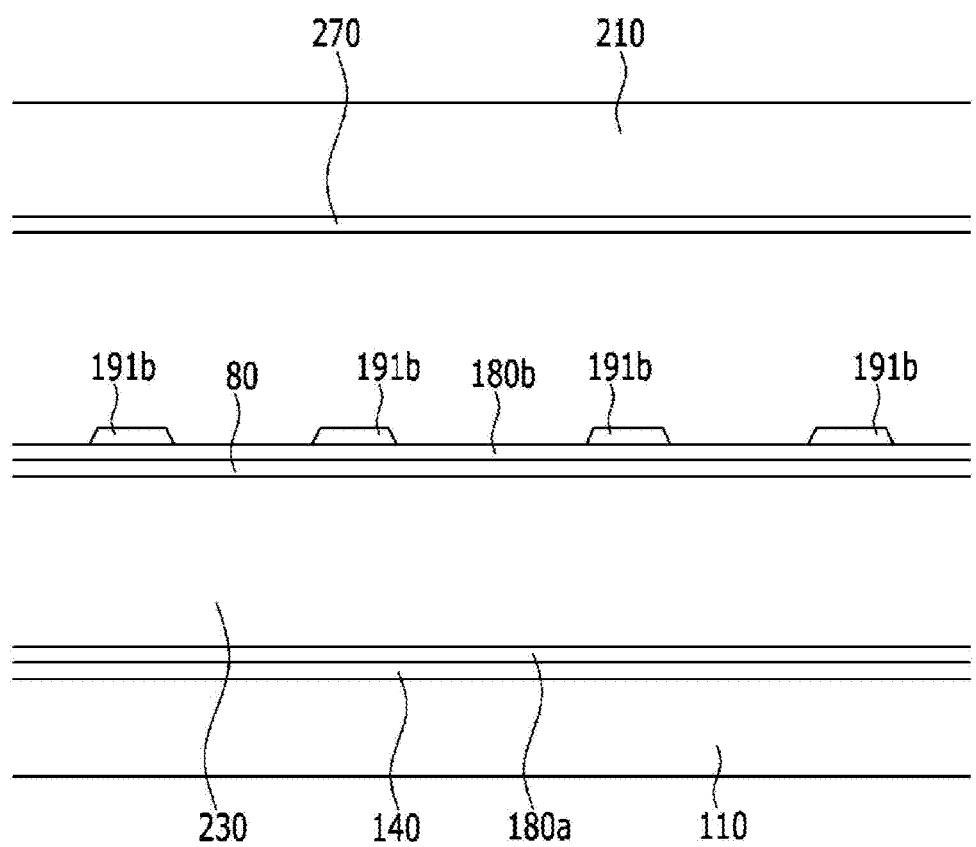
FIG. 7 is a cross-sectional view of the liquid crystal display of FIG. 1 taken along the line VII-VII.

The liquid crystal display will be described with reference to FIGS. 1 to 7. FIG. 1 is a layout view of a liquid crystal display according to an exemplary embodiment of the present invention. FIG. 2 is a cross-sectional view of the liquid crystal display of FIG. 1 taken along the line II-II. FIG. 3 is a layout view of a first subpixel electrode of the liquid crystal display of FIG. 1. FIG. 4 is a layout view of a portion of the first subpixel electrode and a second subpixel electrode of the liquid crystal display of FIG. 1. FIG. 5 is a cross-sectional view of the liquid crystal display of FIG. 1 taken along the line V-V. FIG. 6 is a cross-sectional view of the liquid crystal display of FIG. 1 taken along the line VI-VI. FIG. 7 is a cross-sectional view of the liquid crystal display of FIG. 1 taken along the line VII-VII.

Referring to FIGS. 1 and 2, the liquid crystal display according to the exemplary embodiment of the present invention includes a lower panel 100 and an upper panel 200 facing each other and a liquid crystal layer 3 disposed between the two display panels 100 and 200.

Referring to the lower panel 100, a gate line 121, a reference voltage line 131, and a first storage electrode 135 are formed on a first insulating substrate 110, which may be made of, for example, transparent glass, plastic, or another suitable transparent material. The gate line 121 extends in a substantially horizontal direction and carries a gate signal.

The gate line 121 may include a wide end (not illustrated) for connection with a first gate electrode 124a, a second gate electrode 124b, and a third gate electrode 124c, and additionally may connect to another layer and/or an external driving circuit.

The reference voltage line 131 extends in a direction substantially parallel to the gate line 121, and has an extension 136 that is connected to a third drain electrode 175c. The reference voltage line 131 may include the first storage electrode 135, which encloses a pixel area.

A gate insulating layer 140 is formed on the gate line 121, the reference voltage line 131, and the first storage electrode 135. A first semiconductor 154a, a second semiconductor 154b, and a third semiconductor 154c are formed on the gate insulating layer 140. The semiconductors 154a, 154b, and 154c may be made of, for example, amorphous silicon, crystalline silicon, or another suitable material.

A plurality of ohmic contacts 163a, 163b, 163c, 165a, and 165b are formed on the first, second, and third semiconductors 154a, 154b, and 154c, as shown in FIG. 2. If the semiconductors 154a, 154b, and 154c are oxide semiconductors, the ohmic contacts may be omitted.

Data line 171 includes a first source electrode 173a and a second source electrode 173b. Additionally data conductors, including a first drain electrode 175a, a second drain electrode 175b, a third source electrode 173a, and a third drain electrode 175c, are formed on the ohmic contacts 163a, 163b, 163c, 165a, 165b, and 165c and the gate insulating layer 140. The second drain electrode 175b is connected to the third source electrode 173c.

The first gate electrode 124a, the first source electrode 173a, the first semiconductor 154a, and the first drain electrode 175a form a first thin film transistor Qa. A channel in the first thin film transistor is formed on a portion of the semiconductor 154a between the first source electrode 173a and the first drain electrode 175a. Similarly thereto, the second gate electrode 124b, the second source electrode 173b, the second semiconductor 154b, and the second drain electrode 175b form a second thin film transistor Qb. A channel in the second thin film transistor is formed on a portion of the semiconductor 154b between the second source electrode 173b and the second drain electrode 175b. The third gate electrode 124c, the third source electrode 173c, the third semiconductor 154c, and the third drain electrode 175c form a third thin film transistor Qc. A channel of the third thin film transistor is formed in a portion of the semiconductor 154c between the third source electrode 173c and the third drain electrode 175c.

A first passivation layer 180a, which may be made of an inorganic insulating material such as silicon nitride and silicon oxide, is formed on the data conductors 171, 173a, 173b, 173c, 175a, 175b, and 175c and exposed portions of the semiconductors 154a, 154b, and 154c.

A color filter 230 is formed on the first passivation layer 180a. However, the color filter 230 may be additionally or alternatively formed on the upper panel 200. A light blocking member (not illustrated) may be disposed in an area where the color filter 230 is not disposed and a portion of the color filter 230. A light blocking member 220 is referred to as a black matrix and prevents light from leaking.

A capping layer 80 is disposed on the color filter 230. A first sub region 191a1 of a first subpixel electrode 191a is disposed on the capping layer 80. The capping layer 80 prevents the color filter 230 from being lifted and suppresses the liquid crystal layer 3 from being polluted due to an organic material, such as a solvent inflowing from the color filter. This configuration prevents defects, such as an afterimage displayed, from occurring when the display is driven.

Referring to FIG. 3, the first sub region 191a1 of the first subpixel electrode 191a is planar in shape, and includes a horizontal connection part disposed at a central portion of the pixel area and four parallelograms. The four parallelograms are disposed around the horizontal connection part and enclose the horizontal connection part. A first extension 193 is disposed at a central portion of the horizontal connection part. Further, the first sub region 191a1 of the first subpixel electrode 191a has a protrusion which vertically extends along a vertical central portion of the pixel area. As such, the first sub region 191a1 of the first subpixel electrode 191a is disposed in a portion of the pixel area.

A second passivation layer 180b is disposed on the capping layer 80 and the first sub region 191a1 of the first subpixel electrode 191a. A second sub region 191a2 of the first subpixel electrode 191a and a second subpixel electrode 191b are disposed on the second passivation layer 180b.

Referring to FIG. 4, the second sub region 191a2 of the first subpixel electrode 191a is disposed at the central portion of the pixel and the overall shape thereof is substantially rhomboid. The second sub region 191a2 of the first subpixel electrode 191a includes a plate-like portion 91a in the central portion, a stem part 91b extending from the plate-like portion 91a and having a cross shape, and a plurality of first branch electrodes 194 extending from the plate-like portion 91a and the stem part 91b. The first branch electrodes 194 extend in four different directions.

The second subpixel electrode 191b includes an outside stem part enclosing an outside of the pixel electrode and a plurality of second branch electrodes 195 extending from the outside stem part. The plurality of second branch electrodes 195 extend in four different directions, as shown in FIG. 4.

Referring again to FIGS. 1 and 2, the first passivation layer 180a and the capping layer 80 have a first contact hole 185a, which exposes a portion of the first drain electrode 175a. The first passivation layer 180a, the capping layer 80, and the second passivation layer 180b have a second contact hole 185b, which exposes a portion of the second drain electrode 175b. Further, the second passivation layer 180b has a third contact hole 186, which exposes a central portion of the first sub region 191a1 of the first subpixel electrode 191a.

The first sub region 191a1 of the first subpixel electrode 191a is physically and electrically connected to the first drain electrode 175a through the first contact hole 185a. The second subpixel electrode 191b is physically and electrically connected to the second drain electrode 175b through the second contact hole 185b. Further, the second sub region 191a2 of the first subpixel electrode 191a is connected to the extension 193 of the first sub region 191a1 of the first subpixel electrode 191a through the third contact hole 186 of the second passivation layer 180b.

The first subpixel electrode 191a and the second subpixel electrode 191b are supplied with a data voltage from each of the first drain electrode 175a and the second drain electrode 175b through the first contact hole 185a and the second contact hole 185b, respectively.

Referring to the upper panel 200, the light blocking member 220 and a common electrode 270 are formed on a second insulating substrate 210 made of transparent glass, plastic, or another suitable transparent material.

However, in the case of a liquid crystal display according to another exemplary embodiment of the present invention, the light blocking member 220 may be disposed on the lower panel 100 and in the case of the liquid crystal display according to another exemplary embodiment of the present invention, the color filter may be disposed on the upper panel 200. Display panels 100 and 200 are provided with an alignment layer (not illustrated), which may be a vertical alignment layer.

Polarizers (not illustrated) may be disposed on outer surfaces of the two display panels 100 and 200, and transmission axes of the two polarizers may be orthogonal to each other, in which one of the transmission axes may be substantially parallel with the gate line 121. However, the polarizers may also be disposed only on the outer surface of any one of the two display panels 100 and 200.

The liquid crystal layer 3 has a negative dielectric anisotropy and liquid crystal molecules of the liquid crystal layer 3 are oriented so that major axes thereof are vertical with reference to the surfaces of the two display panels 100 and 200 when no electric field is present. Therefore, the incident light does not pass through the orthogonal polarizers but is blocked, when no electric field is present.

At least one of the liquid crystal layer 3 and the alignment layer may include a photo-reactive material, specifically, reactive mesogen.

Next, a driving method of the liquid crystal display according to the exemplary embodiment of the present invention will be briefly described.

When the gate line 121 is supplied with a gate-on signal, the first gate electrode 124a, the second gate electrode 124b, and the third gate electrode 124c are supplied with the gate-on signal, such that the first switching element Qa, the second switching element Qb, and the third switching element Qc are turned on. When the switching elements Qa and Qb are turned on, a data voltage applied to the data line 171 is applied to a first subpixel electrode 191a and a second subpixel electrode 191b through the first and second switching elements Qa and Qb. The first subpixel electrode 191a and the second subpixel electrode 191b are supplied with a voltage having the same magnitude. However, the voltage applied to the second subpixel electrode 191b is divided by the third switching element Qc, which is connected to the second switching element Qb in series. Therefore, the voltage applied to the second subpixel electrode 191b is smaller than the voltage applied to the first subpixel electrode 191a.

Although in the current exemplary embodiment the third switching element Qc is connected to the second switching element Qb in series, the present invention is not limited thereto, but may be applied to all the cases in which the magnitude in voltage applied to the first subpixel electrode 191a is larger than the magnitude in voltage applied to the second subpixel electrode 191b.

Referring again to FIG. 1, one pixel area of the liquid crystal display has a first region H in which a portion of the first sub region 191a1 of the first subpixel electrode 191a and the first subpixel electrode 191a are disposed. One pixel area of the liquid crystal display also has a second region M in which a portion of the first sub region 191a1 of the first subpixel electrode 191a and a portion of the second subpixel electrode 191b are disposed, and a third region L in which a portion of the second subpixel electrode 191b is disposed. Further, the first region H includes a first area H1, a second area H2, a third area H3, and a fourth area H4.

The first region H, the second region M, and the third region L each have four regions along a direction in which the first branch electrodes 194 or the second branch electrodes 195 extend.

Next, the first region H, the second region M, and the third region L which are included in one pixel area of the liquid crystal display according to the exemplary embodiment of the present invention will be described with reference to FIGS. 5 to 7.

Referring to FIG. 5, the first region H of one pixel area of the liquid crystal display includes a first area H1 in which the plate-like portion 91a of the second sub region 191a2 of the first subpixel electrode 191a connected to the extension 193 of the first sub region 191a1 of the first subpixel electrode 191a is disposed. The first region H includes a second area H2 in which a portion of the first branch electrodes 194 of the second sub region 191a2 of the first subpixel electrode 191a disposed on the second passivation layer 180b is disposed. The first region H includes a third area H3 in which a portion of the first sub region 191a1 of the first subpixel electrode 191a and a portion of the first branch electrodes 194 of the second sub region 191a2 of the first subpixel electrode 191a overlap each other and have the second passivation layer 180b disposed therebetween. The first region H includes a fourth area H4 in which a portion of the first sub region 191a1 of the first subpixel electrode 191a is disposed.

In the first area H1 of the first region H of the pixel area, the plate-like portion 91a and the common electrode 270 generate an electric field. The liquid crystal molecules of the liquid crystal layer 3 are arranged by the electric field.

In the second area H2 of the first region H of the pixel area, a portion of the first branch electrodes of the second sub region 191a2 and the common electrode 270 generate an electric field, and the liquid crystal molecules of the liquid crystal layer 3 are arranged by the electric field.

In the third area H3 of the first region H of the pixel area, the liquid crystal molecules of the liquid crystal layer 3 are arranged by the electric field formed between the first sub region 191a1 of the first subpixel electrode 191a disposed between the first branch electrodes 194 of the second sub region 191a2, and the common electrode 270. Additionally, an electric field is formed between a portion of the first branch electrodes 194 of the second sub region 191a2 of the first subpixel electrode 191a, which is disposed on the lower panel 100, and the common electrode 270 on the upper panel 200.

In the fourth area H4 of the first region H of the pixel area, a portion of the first sub region 191a1 of the first subpixel electrode 191a, which is disposed on the lower panel 100, and the common electrode 270, which is disposed on the upper panel 200, generate an electric field. The liquid crystal molecules of the liquid crystal layer 3 are arranged by the electric field.

In this case, the liquid crystal molecules of the liquid crystal layer 3 disposed in the second area H2 and the third area H3 of the first region H lie in four different directions. This configuration of liquid crystal molecules is due to a fringe field that is generated by edges of the first branch electrodes 194 of the second sub region 191a2 of the first subpixel electrode 191a, which is disposed in the second area H2 and the third area H3 of the first region H. In more detail, a horizontal component of the fringe field generated by the plurality of first branch electrodes 194 is approximately horizontal to sides of the plurality of first branch electrodes 194, such that the liquid crystal molecules are inclined in a direction in parallel with a length direction of the plurality of first branch electrodes 194. The liquid crystal molecules, which are disposed in the first area H1 and the fourth area H4 of the first region H, are inclined in a direction in parallel to a direction in which the liquid crystal molecules disposed in the second area H2 and the third area H3 of the first region H are inclined, by the influence of the liquid crystal molecules which are disposed in the second area H2 and the third area H3 of the first region H.

As described above, the first sub region 191a1 of the first subpixel electrode 191a and the second sub region 191a2 of the first subpixel electrode 191a are connected to each other through the third contact hole 186 and are supplied with a voltage having the same magnitude.

In the first region H, the strength of the electric field is largest in an area of the first area H1 where the plate-like portion 91a of the second sub region 191a2 of the first subpixel electrode 191a having a plate shape and the common electrode 270 disposed on the upper panel 200 generate an electric field. In the first region H, the strength of the electric field is second largest in an area where the third area H3, which generates the electric field formed between the first sub region 191a1 of the first subpixel electrode 191a disposed between the first branch electrodes 194 of the second sub region 191a2, and the common electrode 270, and in an area between a portion of the first branch electrodes 194 of the second sub region 191a2 of the first subpixel electrode 191a and the common electrode 270 on the upper panel 200.

Further, a strength of the electric field is third largest in the second area H2 where a portion of the first branch electrodes 194 of the second sub region 191a2 of the first subpixel electrode 191a formed on the second passivation layer 180b and the common electrode 270 disposed on the upper panel 200 generate the electric field. The strength of the electric field of the fourth area H4 is smallest in an area where a portion of the first sub region 191a1 of the first subpixel electrode 191a disposed beneath the second passivation layer 180b and the common electrode 270 disposed on the upper panel 200 generate the electric field.

Referring to FIG. 6, in the second region M of one pixel area of the liquid crystal display, a portion of the first sub region 191a1 of the first subpixel electrode 191a which is disposed on the lower panel 100 and a portion of the plurality of second branch electrodes 195 of the second subpixel electrode 191b overlap each other, having the second passivation layer 180b disposed therebetween. Therefore, the liquid crystal molecules of the liquid crystal layer 3 are arranged by the electric field formed between the first sub region 191a1 of the first subpixel electrode 191a overlapping portions between the plurality of second branch electrodes 195 of the second subpixel electrode 191b, and the common electrode 270. The liquid crystal molecules are also arranged by the electric field formed between the plurality of second branch electrodes of the second subpixel electrode 191b and the common electrode 270 on the upper panel 200.

In this case, the liquid crystal molecules of the liquid crystal layer 3 which is disposed in the second region M lie in four different directions because of the fringe field which is generated by the edges of the plurality of second branch electrodes 195. In more detail, a horizontal component of the fringe field caused by the plurality of second branch electrodes 195 is substantially horizontal to sides of the plurality of second branch electrodes 195, such that the liquid crystal molecules are inclined in a direction parallel to a length direction of the plurality of second branch electrodes 195.

As described above, the magnitude of voltage applied to the second subpixel electrode 191b becomes smaller than that of voltage applied to the first subpixel electrode 191a. Therefore, compared to a strength of the electric field formed in the first region H, in which the first subpixel electrode 191a supplied with the relatively higher voltage is disposed, a strength of the electric field formed in the second region M is relatively smaller.

Next, referring to FIG. 7, in the third region L of one pixel area of the liquid crystal display according to the exemplary embodiment of the present invention, the plurality of second branch electrodes 195 of the second subpixel electrode 191b, which is disposed on the lower panel 100, generates the electric field with the common electrode 270 disposed on the upper panel 200. In this case, the liquid crystal molecules of the liquid crystal layer 3, which is disposed in the second region M, lie in four different directions because of the fringe field that is generated by the edges of the plurality of second branch electrodes 195. In more detail, a horizontal component of the fringe field by the plurality of second branch electrodes 195 is substantially horizontal to sides of the plurality of second branch electrodes 195, such that the liquid crystal molecules are inclined in a direction parallel to a length direction of the plurality of second branch electrodes 195.

As described above, the magnitude of second voltage applied to the second subpixel electrode 191b is smaller than that of first voltage applied to the first subpixel electrode 191a.

Therefore, the strength of the electric field applied to the liquid crystal layer disposed in the first region H is largest and the strength of the electric field applied to the liquid crystal layer disposed in the third region L is smallest. Since, in the second region M, the influence of the electric field of the first subpixel electrode 191a disposed beneath the second subpixel electrode 191b is present, the strength of the electric field applied to the liquid crystal layer disposed in the second region M is smaller than the strength of the electric field applied to the liquid crystal layer disposed in the first region H and is larger than the strength of the electric field applied to the liquid crystal layer disposed in the third region L.

Further, in the first region H, the strength of the electric field of the first area H1 is largest, the strength of the electric field of the third area H3 is second largest, the strength of the electric field of the second area H2 is third largest, and the strength of the electric field of the fourth area H4 is smallest.

As such, the liquid crystal display according to the exemplary embodiment of the present invention divides one pixel area into the first region in which the first subpixel electrode supplied with the relatively higher first voltage is disposed, the second region in which a portion of the first subpixel electrode and a portion of the second subpixel electrode supplied with the relatively lower second voltage overlap each other, having an insulating layer disposed therebetween, and the third region in which the second subpixel electrode supplied with the relatively lower second voltage is disposed. The first region, in which the first subpixel electrode is disposed, is divided into four regions, that is, a first area, a second area, a third area, and a fourth area which have different strengths of electric field.

Therefore, the strengths of electric field applied to the liquid crystal molecules which correspond to the first region, the second region, the third region, the first area, the second area, the third area, and the fourth area are different and, thus, the tilt angles of the liquid crystal molecules are different, such that the luminance of each region may be different. As such, when one pixel area is divided into three regions having different luminance and the first region is divided into four areas, a change in transmittance depending on the gray may be finely controlled in order to prevent the transmittance from suddenly changing depending on the change in gray even in the low gray and the high gray at the side. To this end, the gray may be accurately represented even at the low gray and the high gray while making the side visibility have similar characteristics to the front visibility.

Figure 8:
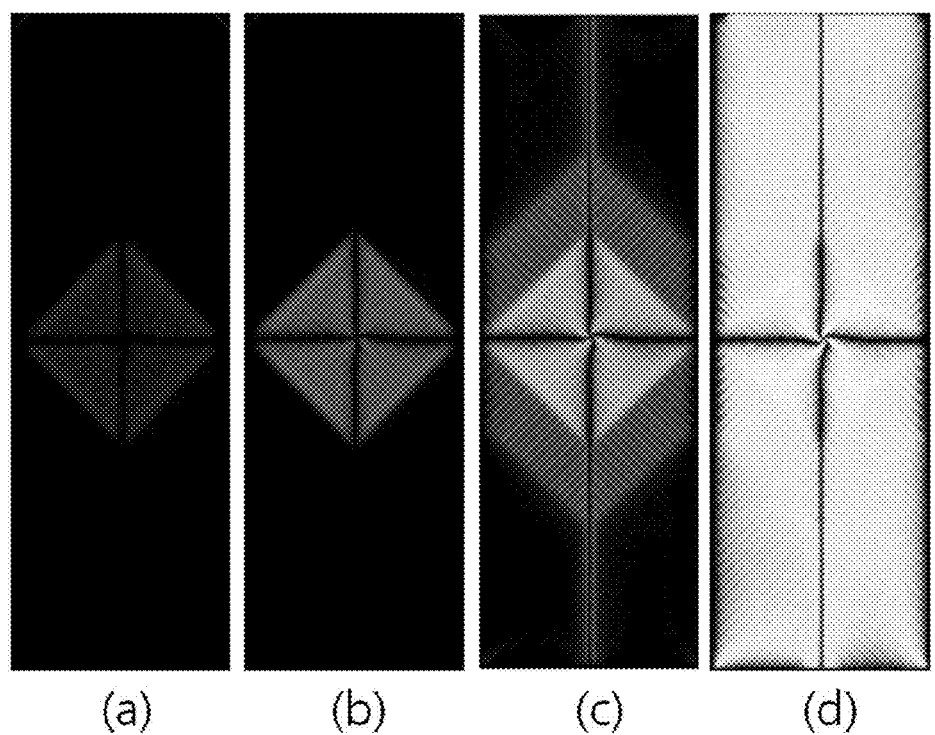
FIGS. 8 and 9 are diagrams illustrating simulation results of the present invention.
Figure 9:
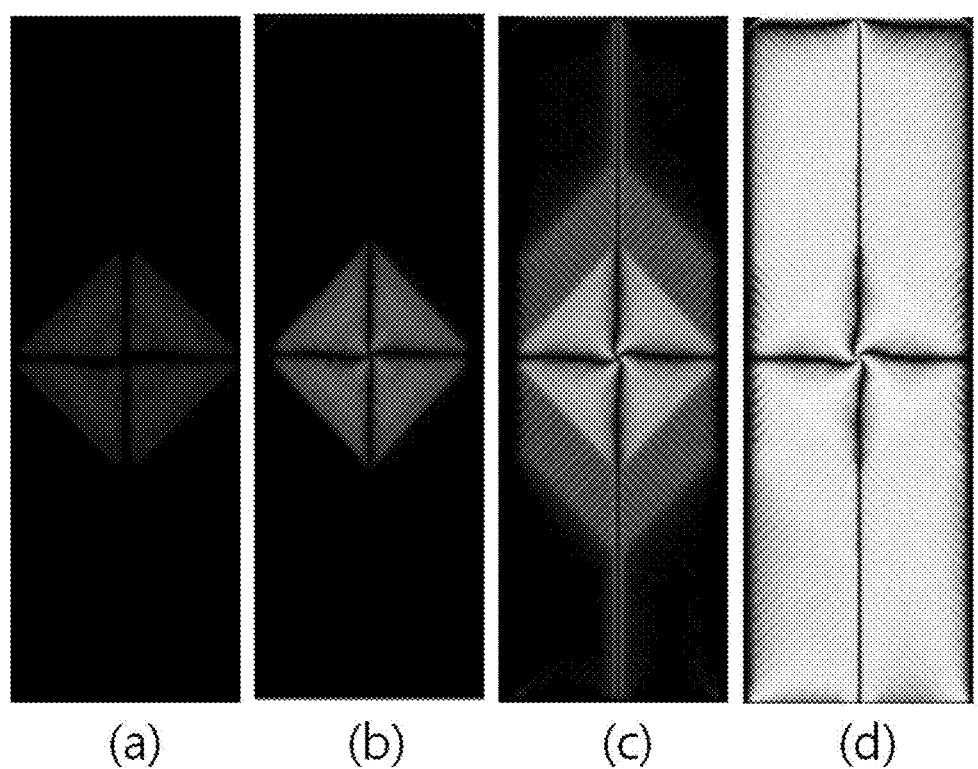

Next, a liquid crystal display according to one Experimental Example of the present invention will be described with reference to FIGS. 8 and 9. FIGS. 8 and 9 are diagrams illustrating simulation results of the present invention.

According to the present simulation, when one pixel region is divided into three regions, that is, the region in which the first subpixel electrode is formed, the region in which the first subpixel electrode and the second subpixel electrode overlap each other, and the region in which the second subpixel electrode is formed while the pixel electrode being supplied with 2.6V, 3V, 4.5V, and 7.5V, results obtained by taking luminance of a test cell by an electron microscope are illustrated in FIGS. 8A, 8B, 8C, and 8D, respectively.

Further, as in the liquid crystal display according to the exemplary embodiment of the present invention, in the case in which one pixel area is divided into three regions, that is, the region in which the first subpixel electrode is formed, the region in which the first subpixel electrode and the second subpixel electrode overlap each other, and the region in which the second subpixel electrode is formed while the pixel electrode being supplied with 2.6V, 3V, 4.5V, and 7.5V, and in the case in which the first region in which the first subpixel electrode is formed is divided into four regions, that is, the first area, the second area, the third area, and the fourth area which have the different strengths of electric field, the results obtained by taking the luminance of the test cell by the electron microscope photograph are illustrated in FIGS. 9A, 9B, 9C, and 9D, respectively.

Referring to FIGS. 8 and 9, according to the existing liquid crystal display, in the case of 2.6V and 3V, which is the low gray, the luminance of the liquid crystal display is defined by the brightness of the first region in which the first subpixel electrode is disposed, but in the case of the liquid crystal display according to the exemplary embodiment of the present invention, even in the case of 2.6V and 3V which is the low gray, it can be appreciated that four regions, that is, the first area, the second area, the third area, and the fourth area of the first region have different luminance.

Therefore, it is possible to prevent the luminance from suddenly changing in the low gray region, and thus it is possible to prevent the luminance from suddenly increasing in the low gray.

Figure 10:
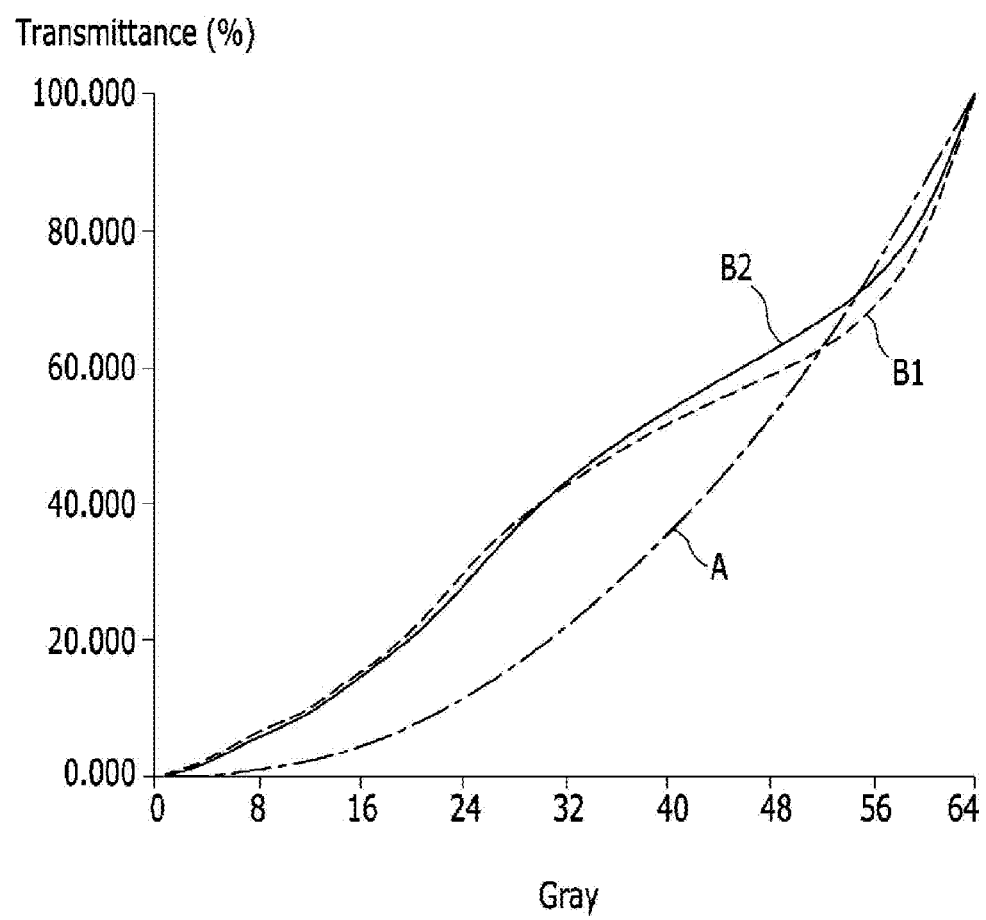
FIGS. 10 and 11 are diagrams illustrating transmittance results of the liquid crystal display according to an experimental example of the present invention.
Figure 11:
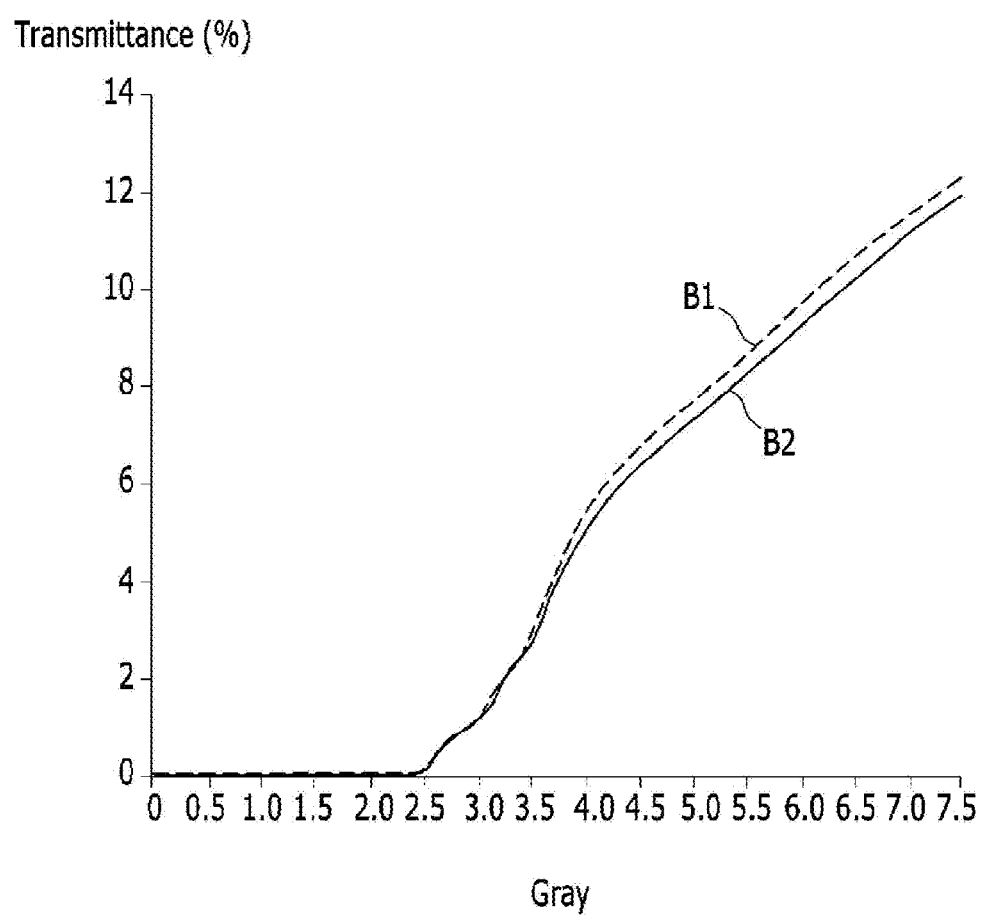

Next, a liquid crystal display according to one Experimental Example of the present invention will be described with reference to FIGS. 10 and 11. FIGS. 10 and 11 are graphs illustrating transmittance depending on the voltage of the liquid crystal display according to Experimental Example according to the present invention.

According to the Experimental Example, the transmittance for each gray at the front surface of the liquid crystal display is measured, and as in the existing liquid crystal display, when one pixel area is divided into three regions, that is, the region in which the first subpixel electrode is formed, the region in which the first subpixel electrode and the second subpixel electrode overlap each other, and the region in which the second subpixel electrode is formed, the transmittance for each gray at the side of the liquid crystal display is measured. When one pixel area is divided into three regions, that is, the region in which the first subpixel electrode is formed, the region in which the first subpixel electrode and the second subpixel electrode overlap each other, and the region in which the second subpixel electrode is formed and the first region in which the first subpixel electrode is formed is divided into four regions, that is, the first area, the second area, the third area, and the fourth area having different strengths of electric field, the transmittance for each gray at the side of the liquid crystal display is measured and the measurement results are illustrated in FIG. 10. Further, an enlarged graph of the low gray region is illustrated in FIG. 11. In FIGS. 10 and 11, a transmittance graph for each gray at the front of the liquid crystal display is illustrated by A, a transmittance graph for each gray at the side of the existing liquid crystal display is illustrated by B1, and a transmittance graph for each gray at the side of the liquid crystal display is illustrated by B2.

Referring to FIG. 10, compared to the transmittance graph B1 for each gray of the liquid crystal display according to the related art, in the transmittance graph B2 for each gray of the liquid crystal display according to the exemplary embodiment of the present invention, it may be appreciated that the transmittance is relatively lower at the low gray.

Referring to FIG. 11, in the low gray region compared to the transmittance graph B1 for each gray of the liquid crystal display according to the related art, it may be appreciated that a transmittance value of the transmittance graph B2 for each gray of the liquid crystal display according to the exemplary embodiment of the present invention is lower.

Referring to FIG. 10, compared to the transmittance graph B1 for each gray of the liquid crystal display according to the related art, in the transmittance graph B2 for each gray of the liquid crystal display according to the exemplary embodiment of the present invention, it may be appreciated that the transmittance at the high gray is changed smoothly for each gray.

In more detail, referring to the graph B1 of FIG. 10, in the case of the liquid crystal display according to the related art, the change in transmittance depending on the change in gray is sleight from a about 48 gray region to a about 56 gray region and then the change in transmittance depending on the change in gray is suddenly increased from a about 56 gray region to a about 64 gray region. As such, according to the liquid crystal display according to the related art, it is difficult to accurately represent the gray at the high gray. However, referring to the graph B2 of FIG. 10, according to the liquid crystal display according to the exemplary embodiment of the present invention, it may be appreciated that the transmittance is changed smoothly depending on the change in gray even at the high gray.

As such, the liquid crystal display according to the exemplary embodiment of the present invention divides one pixel area into the first region in which the first subpixel electrode supplied with the relatively higher first voltage is disposed, the second region in which a portion of the first subpixel electrode and a portion of the second subpixel electrode supplied with the relatively lower second voltage overlap each other, having an insulating layer disposed therebetween, and the third region in which the second subpixel electrode supplied with the relatively lower second voltage is disposed and divides the first region in which the first subpixel electrode is disposed into four regions, that is, the first area, the second area, the third area, and the fourth area which have different strengths of electric field to smoothly control the change in transmittance depending on the gray, such that the sudden change in transmittance depending on the change in gray is prevented even at the low gray and the high gray at the side, thereby accurately representing the gray even at the low gray and the high gray while making the side visibility close to the front visibility.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a first subpixel electrode disposed on the first substrate, the first subpixel electrode configured to receive a first voltage, and comprising a first sub region and a second sub region;
a second subpixel electrode disposed on the first substrate and configured to be supplied with a second voltage;
an insulating layer disposed on the first sub region of the first subpixel electrode and disposed beneath the second subpixel electrode and the second sub region of the first subpixel electrode;
a second substrate facing the first substrate; and
a common electrode disposed on the second substrate, wherein:
the first subpixel electrode is disposed in a first region, the first region comprising:
  a first area in which a first portion of the second sub region comprising a planar shape is disposed;
  a second area in which a second portion of the second sub region comprising a plurality of first branch electrodes which extend in different directions is disposed;
  a third area in which a first portion of the first sub region comprising a planar shape and a third portion of the second sub region comprising a plurality of first branch electrodes which extend in different directions overlap each other, having the insulating layer disposed therebetween; and
  a fourth area in which a second portion of the first sub region comprising a planar shape is disposed; and
magnitudes of electric fields generated in the first area, the second area, the third area, and the fourth area are different from each other.

2. The liquid crystal display of claim 1, wherein the first voltage is larger than the second voltage.

3. The liquid crystal display of claim 2, further comprising:
a second region in which a third portion of the first sub region of the first subpixel electrode and a first portion of the second subpixel electrode overlap each other, having the insulating layer disposed therebetween; and
a third region in which a second portion of the second subpixel electrode is disposed.

4. The liquid crystal display of claim 3, wherein:
the third portion of the first sub region of the first subpixel electrode comprises a planar shape, and
the first portion of the second subpixel electrode and the second portion of the second subpixel electrode comprise a plurality of second branch electrodes which extend in different directions.

5. The liquid crystal display of claim 4, wherein:
a direction in which the plurality of first branch electrodes extend is parallel to a direction in which the plurality of second branch electrodes extends.

6. The liquid crystal display of claim 5, wherein:
the first sub region and the second sub region are electrically connected to each other through a contact hole in the insulating layer.

7. The liquid crystal display of claim 1, further comprising:
a second region in which a third portion of the first sub region of the first subpixel electrode and a first portion of the second subpixel electrode overlap each other, having the insulating layer disposed therebetween; and a third region in which a second portion of the second subpixel electrode is disposed.

8. The liquid crystal display of claim 7, wherein:
the third portion of the first sub region of the first subpixel electrode comprises a planar shape, and
the first portion of the second subpixel electrode and the second portion of the second subpixel electrode comprises a plurality of second branch electrodes which extend in different directions.

9. The liquid crystal display of claim 8, wherein:
a direction in which the plurality of first branch electrodes extend is parallel to a direction in which the plurality of second branch electrodes extend.

10. The liquid crystal display of claim 9, wherein:
the first sub region and the second sub region are electrically connected to each other through a contact hole in the insulating layer.

* * * * *